(12) United States Patent
Ikuno

(10) Patent No.: US 8,901,215 B2
(45) Date of Patent: Dec. 2, 2014

(54) RESIN COMPOSITION AND RESIN MOLDED ARTICLE

(75) Inventor: Masaya Ikuno, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 13/454,418

(22) Filed: Apr. 24, 2012

(65) Prior Publication Data

US 2013/0158175 A1    Jun. 20, 2013

(30) Foreign Application Priority Data

Dec. 16, 2011    (JP) ................................. 2011-275505

(51) Int. Cl.
    *C08L 67/04*      (2006.01)
    *C08K 5/29*      (2006.01)

(52) U.S. Cl.
    USPC ............................. 524/100; 524/127; 524/195

(58) Field of Classification Search
    USPC ........................................ 524/195, 100, 127
    See application file for complete search history.

(56) References Cited

U.S. PATENT DOCUMENTS

| 8,148,453 B2 | 4/2012 | Ikuno et al. | |
| 2010/0174017 A1* | 7/2010 | Tobita et al. | 524/192 |
| 2011/0118395 A1* | 5/2011 | Kiuchi et al. | 524/116 |
| 2011/0218278 A1 | 9/2011 | Ikuno et al. | |

FOREIGN PATENT DOCUMENTS

| EP | 2 363 434 A1 | 9/2011 | |
| JP | 2010-111739 | * 5/2010 | .............. C08L 67/04 |
| JP | A-2010-111737 | 5/2010 | |
| JP | A-2010-111739 | 5/2010 | |
| JP | A-2011-6605 | 1/2011 | |
| JP | A-2011-80015 | 4/2011 | |
| JP | A-2011-153296 | 8/2011 | |
| JP | A-2011-162651 | 8/2011 | |
| JP | A-2011-178932 | 9/2011 | |
| JP | A-2011-190380 | 9/2011 | |
| WO | WO 2011/043187 A1 | 4/2011 | |

OTHER PUBLICATIONS

Machine translation of JP 2010-111739. May 2010.*
Machine translation of JP 2011-153296. Aug. 2011.*
English-language translation of Mar. 19, 2013 Office Action issued in Japanese Patent Application No. 2011-275505.

* cited by examiner

*Primary Examiner* — John Uselding
(74) *Attorney, Agent, or Firm* — Oliff PLC

(57) ABSTRACT

A resin composition includes a polylactic acid, a solid flame retardant that has at least one functional group selected from the group consisting of a phosphate group, a sulfate group, and a sulfite group in a structure, a bifunctional compound that has a carbodiimide group, and a crystal nucleating agent.

11 Claims, 3 Drawing Sheets

RESIN COMPOSITION AND RESIN MOLDED ARTICLE

CROSS-REFERENCE TO RELATED APPLICATIONS

This application is based on and claims priority under 35 USC 119 from Japanese Patent Application No. 2011-275505 filed Dec. 16, 2011.

BACKGROUND

1. Technical Field

The present invention relates to a resin composition and a resin molded article.

2. Related Art

Hitherto, polymer materials such as polystyrene, polystyrene-ABS resin copolymer, polycarbonate, polyester, polyphenylene sulfide, and polyacetal have been used for components of electric products and electronic and electric equipment, since they are superior in heat resistance and mechanical strength and, particularly, superior in maintainability of mechanical strength against environmental changes in the case of the components of the electronic and electric equipment.

In recent years, from the viewpoint of the environment, use of polylactic acid-based resin materials which are materials originating from plants, which involve a small amount of $CO_2$ discharged, which use a small amount of petroleum as a non-renewable resource, and which cause a small environmental load instead of the polymer materials has been studied.

In order to impart flame retardance to a polylactic acid, a technique of adding phosphorous-based or inorganic hydroxide-based flame retardants has been known in the past.

SUMMARY

According to an aspect of the invention, there is provided a resin composition including: a polylactic acid; a solid flame retardant that has at least one functional group selected from the group consisting of a phosphate group, a sulfate group, and a sulfite group in a structure; a bifunctional compound that has a carbodiimide group; and a crystal nucleating agent.

BRIEF DESCRIPTION OF THE DRAWINGS

Exemplary embodiments of the present invention will be described in detail based on the following figures, wherein.

DETAILED DESCRIPTION

Figure 1:
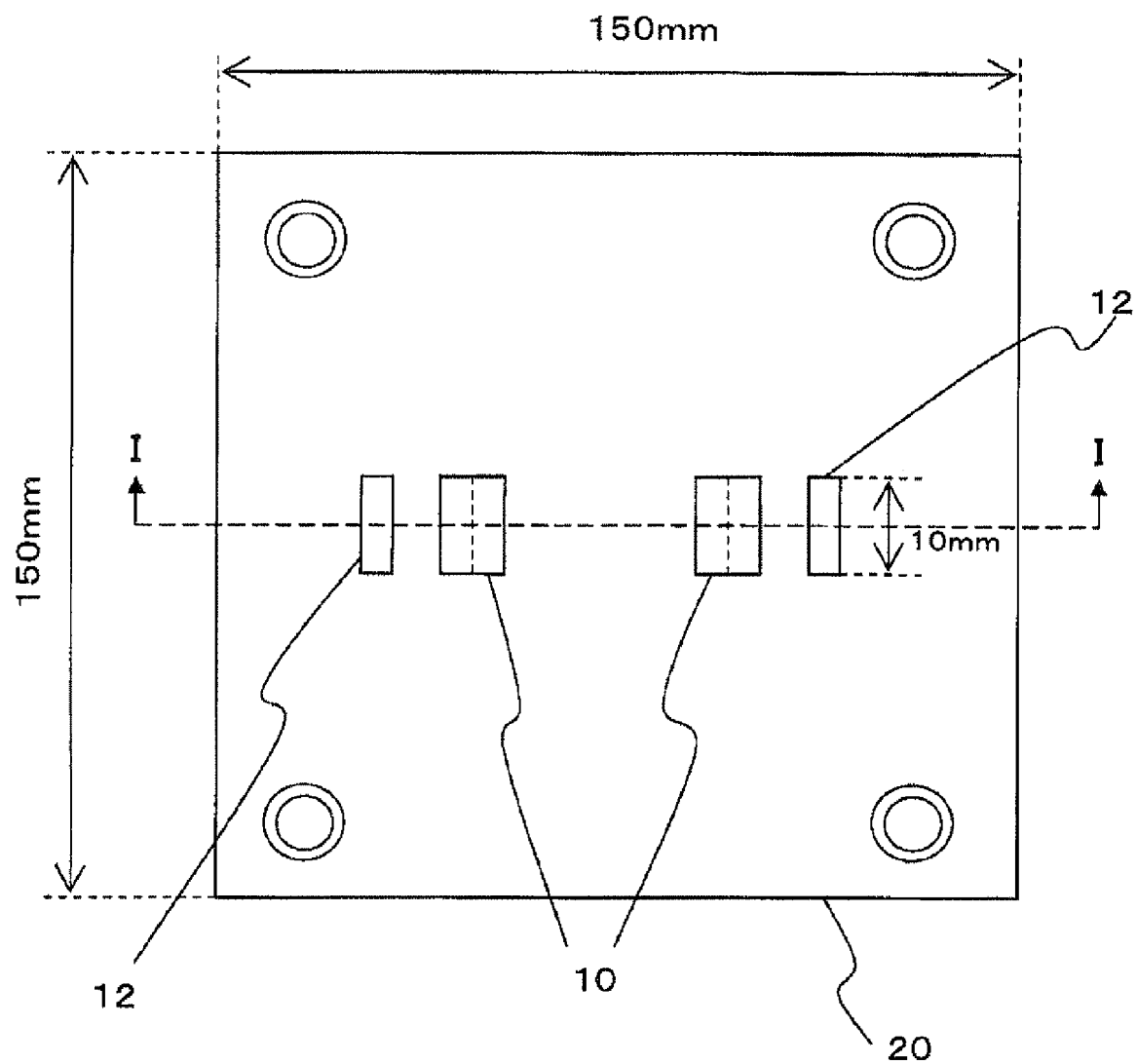
FIG. 1 is a plan view illustrating an example of a test sample provided for a snap-fit test.

Hereinafter, a resin composition and a resin molded article according to an exemplary embodiment of the invention will be described. This exemplary embodiment is an example for carrying out the invention and the invention is not limited to this exemplary embodiment.

Resin Composition

A resin composition according to this exemplary embodiment includes (A) a polylactic acid, (B) a solid flame retardant that has at least one functional group selected from the group consisting of a phosphate group, a sulfate group, and a sulfite group in a structure thereof, (C) a bifunctional compound that has a carbodiimide group, and (D) a crystal nucleating agent.

The resin composition according to this exemplary embodiment may maintain superior flame retardance in a resin material using a polylactic acid as a main component, which was difficult to achieve in the related art, and has improved deformation resistance to be described later up to a level which could not be predicted with this constitution. Although the reason thereof is not certain, it is thought that the elasticity or the mechanical strength is improved since at least one functional group selected from the group consisting of a phosphate group, a sulfate group, and a sulfite group in the structure in the (B) flame retardant and a carboxylic acid group of the (A) polylactic acid are coupled to each other via the carbodiimide group of the (C) bifunctional compound.

Another resin composition according to this exemplary embodiment includes (E) a rubber and/or thermoplastic elastomer in addition to the components (A), (B), (C), and (D).

Another resin composition according to this exemplary embodiment may maintain superior flame retardance in a resin material using a polylactic acid as a main component, which was difficult to achieve in the related art, and has improved deformation resistance and mechanical strength under high-temperature and high-humidity conditions to be described later up to a level which could not be predicted with this constitution, compared with a case not including the component (E). Although the reason thereof is not sure, it is thought that the elasticity is improved and the mechanical strength with the lapse of time is improved since at least one functional group selected from the group consisting of a phosphate group, a sulfate group, and a sulfite group in the structure in the (B) flame retardant, a carboxylic acid group of the (A) polylactic acid, and the functional group of the (E) rubber and/or thermoplastic elastomer are coupled to each other via the carbodiimide group of the (C) bifunctional compound, compared with a case not including the (E) rubber and/or thermoplastic elastomer.

For example, when an ammonium polyphosphate is used as the (E) flame retardant and an acryl-based rubber and/or an acryl-based thermoplastic elastomer is used as the (E) rubber and/or thermoplastic elastomer, it is thought that the reaction site (or the functional group) of the ammonium polyphosphate, the carboxylic acid group of the (A) polylactic acid, and the reactive group (or the functional group) of the acryl-based rubber and/or an acryl-based thermoplastic elastomer are coupled to each other via the carbodiimide group of the (C) bifunctional compound, whereby the elasticity is improved and the mechanical strength under high-temperature and high-humidity conditions is improved, compared with a case not including the (E) rubber and/or thermoplastic elastomer.

(A) Polylactic Acid

The polylactic acid originates from plants and has an advantage of a decreased environmental load, that is, a decrease in the amount of $CO_2$ discharged and a decrease in the amount of petroleum used. The polylactic acid is not particularly limited, as long as it is a condensation product of a lactic acid. Examples thereof include a poly-L-lactic acid (hereinafter, also referred to as a "PLLA"), a poly-D-lactic acid (hereinafter, also referred to as a "PDLA") a mixture thereof via copolymerization or blending, and a stereocomplex type polylactic acid (hereinafter, also referred to as an "SC-PLA") in which the poly-L-lactic acid and the poly-D-lactic acid are mixed and helical structures thereof engage with each other well and which has superior heat resistance. Synthetic products or commercially-available products may be used as the polylactic acid. Examples of the commercially-available products include "Terramac TE4000", "Terramac TE2000", and "Terramac TE7000" which are made by Unitika Limited and Racea H100 made by Mitsui Chemicals Inc. "Terramac TE7000" may include 1 part by weight of a clay as a crystal nucleating agent with respect to 100 parts by weight of the polylactic acid. These polylactic acids may be used alone or in combination of two or more types. In this exemplary embodiment, the polylactic acid is included as a main component of the resin composition. Here, the "main component" means that the content thereof is greater than 50% by weight with respect to the total content of the resin composition.

The content of the (A) polylactic acid in this exemplary embodiment is preferably in the range of from 30% by weight to 80% by weight with respect to the total content of the resin composition and more preferably in the range of from 50% by weight to 70% by weight with respect to the total content of the resin composition. When the content of the (A) polylactic acid is less than 30% by weight with respect to the total content of the resin composition, the environmental load is great. On the other hand, when the content of the polylactic acid is greater than 80% by weight with respect to the total content of the resin composition, the extended based portion of a snap-fit portion is whitened and is mechanically weakened in a snap-fit test to be described later.

The molecular weight of the polylactic acid is not particularly limited. In this exemplary embodiment, the weight-average molecular weight of the polylactic acid is preferably in the range of from 8,000 to 200,000 and more preferably in the range of from 15,000 to 120,000. When the weight-average molecular weight of the polylactic acid is less than 8,000, the combustion rate of the resin composition is apt to increase and thus to lower the mechanical strength at a low temperature. On the other hand, when the weight-average molecular weight of the polylactic acid is greater than 200,000, flexibility of the resin composition is apt to decrease and to deteriorate a drip self-extinguishing property of the resin composition, thereby deteriorating the flame retardance in any case. The "drip self-extinguishing property" means that the resin composition is melted and lost due to heat.

The weight-average molecular weight of the polylactic acid in the resin composition means a weight-average molecular weight obtained by cooling the resin composition in an atmosphere of liquid nitrogen, cutting a sample for measurement from the surface thereof, dissolving the sample for measurement in a deuterated chloroform at a concentration of 0.1 by weight, and measuring the molecular weight of the polylactic acid separated through the use of a gel permeation chromatograph. "HLC-8220 GPC" made by Tosoh Corporation is used as the gel permeation chromatograph in the measurement.

(B) Flame Retardant

The flame retardant used in this exemplary embodiment is a flame retardant which is solid at 200° C. and has at least one functional group selected from the group consisting of a phosphate group, a sulfate group, and a sulfite group in the structure thereof, as described above. An ammonium polyphosphate may be used as an example of the solid flame retardant having a phosphate group as the functional group in the structure thereof and examples thereof include "Exolit AP422" (product name, made by Clariant GmbH), "Exolit AP462" (product name, made by Clariant GmbH), "FR CROS 484" (product name, made by Budenheim Iberica Commercial Sa), and "Terraju S10" (product name, made by Chisso Corporation).

"Exolit AP422" (product name) is an ammonium polyphosphate which is expressed by Formula $(NH_4PO_3)_n$ (where n is in the range of 200 to 1000), which is of a self-flowable powder type, and which has low solubility in water. "Exolit AP462" (product name) is micro capsules obtained by encapsulating "Exolit AP422" with a melamine resin. "FR CROS 484" (product name) is an ammonium polyphosphate (Type II) with an average particle diameter (d50) of 18 μm. The ammonium polyphosphate (Type II) is a polymer ammonium polyphosphate with a degree of polymerization of 1000 or more having a lot of bridges or branches and has both a high decomposition temperature and a low solubility. "Terraju S10" (product name) is the above-mentioned Type II ammonium polyphosphate.

Examples of the solid flame retardant having a sulfate group as a function group in the structure thereof include "Apinon 901" (product name, made by Sanwa Chemical Co., Ltd.) including melamine sulfate, a guanidine sulfate, a sulfuric acid, an ethylamine sulfate, and a pyridine sulfate.

Examples of the solid flame retardant having a sulfite group as a functional group in the structure thereof include amine sulfite-based compounds.

The content of the (B) flame retardant in this exemplary embodiment is preferably in the range of from 10% by weight to 40% by weight with respect to the total content of the resin composition and more preferably in the range of from 20% by weight to 35% by weight with respect to the total content of the resin composition. When the content of the (B) flame retardant is less than 10% by weight with respect to the total content of the resin composition, the flame retardance of the resin composition is deteriorated, a snap-fit portion does not endure and is deformed or cracked in an endurance test under high-temperature and high-humidity conditions to be described later, and the extended base portion of the snap-fit portion is whitened and mechanically weakened in a snap-fit test to be described later. On the other hand, when the content of the (B) flame retardant is greater than 40% by weight with respect to the total content of the resin composition, the extended base portion of the snap-fit portion is whitened and mechanically weakened in a snap-fit test to be described later.

(C) Bifunctional Compound Having Carbodiimide Group

The bifunctional reactant used in this exemplary embodiment is a compound having a carbodiimide group expressed by "—N=C=N—" in the molecule thereof and having two functional groups reacting with the terminal group (such as a carboxyl group or a hydroxyl group) of the (A) polylactic acid or the above-mentioned functional group of the (B) flame retardant.

Examples of the bifunctional compound having the functional group reacting with the terminal group of the polylactic acid include dicarboxylate compounds. Examples of the dicarbomiimide compound include an aliphatic dicarbodiimide and an aromatic dicarbodiimide.

The dicarbodiimide compounds may be used alone or in combination of two or more types. Examples of the dicarbomiimide compound include N,N-diisopropyl carbodiimide, N,N'-dicyclohexyl carbodiimide, and "Stabaxol 1-LF" (product name, made by Rhein Chemie Corporation). Here, the "Stabaxol 1-LF" (product name) is N,N'-di-2,6-diisopropylphenyl carbodiimide.

The content of the (C) bifunctional compound having a carbodiimide group in this exemplary embodiment is preferably in the range of from 0.1% by weight to 5% by weight with respect to the total content of the resin composition and more preferably in the range of from 0.5% by weight to 3% by weight with respect to the total content of the resin composition. When the (C) bifunctional compound having a carbodiimide group is less than 0.1% by weight with respect to the total content of the resin composition, the extended base portion of the snap-fit portion is whitened and mechanically weakened in a snap-fit test to be described later, and the snap-fit portion does not endure a load and is deformed or cracked in a resistance test under high-temperature and high-humidity conditions to be described later. On the other hand, when the content of the (C) bifunctional compound having a carbodiimide group is greater than 5% by weight with respect to the total content of the resin composition, the flame retardance of the resin composition is deteriorated.

(D) Crystal Nucleating Agent

The crystal nucleating agent used in this exemplary embodiment is not particularly limited, as long as it may be used as a crystal nucleating agent of general polymers. Both an inorganic crystal nucleating agent and an organic crystal nucleating agent may be used. Specific examples of the inorganic crystal nucleating agent include metal salts such as talc, kaolinite, montmorillonite, synthetic mica, clay, zeolite, silica, graphite, carbon black, zinc oxide, magnesium oxide, titanium oxide, calcium sulfide, boron nitride, calcium carbide, barium sulfate, aluminum oxide, neodymium oxide, and phenyl phosphonate. These inorganic crystal nucleating agents is preferably modified with an organic material so as to enhance the dispersibility in the composition.

Specific examples of the organic crystal nucleating agent include organic metal carboxylates such as sodium benzoate, potassium benzoate, lithium benzoate, magnesium benzoate, barium benzoate, lithium terephthalate, sodium terephthalate, potassium terephthalate, calcium oxalate, sodium laurate, potassium laurate, sodium myristate, potassium myristate, calcium myristate, sodium octacosanoate, calcium octacosanoate, sodium stearate, potassium stearate, lithium stearate, calcium stearate, magnesium stearate, barium stearate, sodium montanate, calcium monotanoate, sodium toluate, sodium salicylate, potassium salicylate, zinc salicylate, aluminum dibenzoate, potassium dibenzoate, lithium dibenzoate, sodium β-naphthalate, and sodium cyclohexane carboxylate, organic sulfonates such as sodium p-toluene sulfonate and sodium sulfoisophthalate, carboxylic amides such as stearic amide, ethylenebislauric amide, palmitic amide, hydroxystearic amide, erucic amide, and trimesic tris(t-butylamide), benzylidene sorbitol and derivatives thereof, phosphorous compound metal salts such as sodium-2,2'-methylene bis(4,6-di-t-butylphenyl)phosphate, and sodium 2,2-methyl bis(4,6-di-butylphenyl).

Among the above-mentioned examples, at least one types selected from the talc, the organic metal carboxylates, and the carboxylic amides may be preferably used as the crystal nucleating agent used in this exemplary embodiment. The crystal nucleating agents in the invention may be used alone or in combination of two or more types. For example, "Terramac TE7000", made by Unitika Limited, in which 1 part by weight of clay is added to 100 parts by weight of the polylactic acid in advance may be used.

The content of the (D) crystal nucleating agent in this exemplary embodiment is preferably in the range of from 0.1% by weight to 20% by weight with respect to the total content of the resin composition and more preferably in the range of from 0.1% by weight to 10% by weight. When the content of the (D) crystal nucleating agent is less than 0.1% by weight with respect to the total content of the resin composition, the snap-fit portion does not endure a load and is deformed or cracked in a resistance test under high-temperature and high-humidity conditions to be described later. On the other hand, when the content of the crystal nucleating agent is greater than 20% by weight with respect to the total content of the resin composition, the extended base portion of the snap-fit portion is whitened and mechanically weakened in a snap-fit test to be described later.

(E) Rubber and/or Thermoplastic Elastomer

Examples of the rubber and/or thermoplastic elastomer used in this exemplary embodiment include a silicone-acryl composite rubber, an acryl-based rubber, a butadiene-based rubber, and a natural rubber. Among these, a core-shell type rubber is an elastic member which has a double structure including a core and a shell and in which the core is in a soft rubber state, the shell on the surface thereof is in a hard resin state, and the rubber itself is in a powder (particle) state. The most particle state of the core-shell type rubber maintains the original shape, even when it is melted and kneaded with the polylactic acid resin. Since the most blended rubber maintains the original shape, the rubber has superior dispersibility in the polylactic acid resin composition and the surface layer thereof is not separated easily.

Commercially-available examples of the core-shell type rubber include "Metablen SX-005", "Metablen SRK200", "Metablen W600A", and "Metablen C-223A" (product names, made by Mitsubishi Rayon Co., Ltd.), "MR-01" and "MR-02" (product names, made by Kaneka Corporation), "Paraloid EXL-2603" (product name, made by Kureha Chemical Industry Co., Ltd.), "Hiblen B621" (product name, made by Nippon Zeon Co., Ltd.), and "Paraloid KM330" (product name, made by Rohm & Hass Co.)

For example, "Metablen SX-005", "Metablen SRK200", "Metablen S-2001", and "Metablen C-223A" made by Mitsubishi Rayon Co., Ltd. have a core-shell structure in which a graft layer is formed on a particle-like rubber. In "Metablen SRK200" and "Metablen S-2001", the core is formed of a Blasien-based rubber and the graft layer is formed of a polycarbonate (PC), a polybutylene terephthalate (PBT), a polyamide (PA), a polyethylene terephthalate (PET), a polystyrene (PS), a vinyl chloride resin (PVC), an ABS resin (ABS), or an acrylic resin (MMA). In "Metablen SX-005", the core is formed of the same material as described above and the graft layer includes a polypropylene (PP) or a polyethylene (PE). In "Metablen C-223A", the core is formed of a silicone-acryl composite rubber and the graft layer includes a PC, a PBT, a PA, a PS, or a PVC.

The content of the (E) rubber and/or thermoplastic elastomer in this exemplary embodiment is preferably in the range of from 1% by weight to 20% by weight with respect to the total content of the resin composition and more preferably in the range of from 5% by weight to 15% by weight with respect to the total content of the resin composition. When the content of the (E) rubber and/or thermoplastic elastomer is less than 1% by weight with respect to the total content of the resin composition, the extended base portion of the snap-fit portion is whitened and mechanically weakened in a snap-fit test to be described later. On the other hand, when the content of the rubber and/or thermoplastic elastomer is greater than 20% by weight with respect to the total content of the resin composition, the flame retardance of the resin composition is deteriorated.

Other Components

The resin composition according to this exemplary embodiment may further include an antioxidant, a stabilizer, an ultraviolet absorber, a drip inhibitor, and other flame retardants.

Examples of the antioxidant include phenol-based, amine-based, phosphorous-based, sulfur-based, hydroquinone-based, and quinoline-based antioxidants.

Examples of the stabilizer include nitrogen-containing compounds such as basic nitrogen-containing compounds such as a polyamide, a poly-β-alanine copolymer, a polyacrylamide, a polyurethane, a melamine, a cyanoguanidine, and a melamine-formaldehyde condensate; alkali or alkaline-earth metal-containing compounds such as organic metal carboxylates (such as a potassium stearate and calcium 12-hydroxy stearate), metal oxides (such as magnesium oxide, calcium oxide, and aluminum oxide), metal hydroxides (such as magnesium hydroxide, calcium hydroxide, and aluminum hydroxide), and metal carbonates; zeolites; and hydrotalcites.

Examples of the ultraviolet absorber include benzophenones, benzotriazoles, cyanoacrylates, salicylates, and anilide oxalates.

The resin composition according to this exemplary embodiment may include other flame retardants, as long as the impact resistance thereof is not damaged. Examples of other flame retardants include silicone-based flame retardants, nitrogen-based flame retardants, and inorganic hydroxide-based flame retardants. The other flame retardants may be used alone or in combination of two or more types.

For example, a polytetrafluoroethylene is used as the drip inhibitor. Examples of the polytetrafluoroethylene include "Fluon PTFE Fine Powder" (where "Fluon" is a registered trademark) made by Asahi Glass Co., Ltd. The "Fluor PTFE Fine Powder" includes "CD1 series" which are polymers with a low reduction ratio (low RR) and "CD0 series" which are copolymers with a high reduction ratio (high RR). In the below examples, "CD145" is used as the drip inhibitor in this exemplary embodiment.

Synthetic products or commercially-available products may be used as the other flame retardants. Examples of the commercially-available products of the silicone-based flame retardant include "DC4-7081" made by Dow Corning Toray Co., Ltd. Examples of the commercially-available products of the nitrogen-based flame retardant include "Melamine Pyrophosphate" made by Shimonoseki Mitsui Chemicals Inc. and "FP2100" made by Adeka Corporation. Examples of the commercially-available products of the inorganic hydroxide-based flame retardant include "MGZ300" made by Sakai Chemical Industry Co., Ltd. and "B103ST" made by Nippon Light Metal Company.

The resin composition according to this exemplary embodiment may include resins other than the polylactic acid, a release agent, a weathering agent, a light stabilizer, and a colorant.

Preparation of Resin Composition

The resin composition according to this exemplary embodiment is prepared by kneading (A) a polylactic acid, (B) a solid flame retardant that has at least one functional group selected from the group consisting of a phosphate group, a sulfate group, and a sulfite group in a structure thereof, (C) a bifunctional compound that has a carbodiimide group, (D) a crystal nucleating agent, (E) a rubber and/or thermoplastic elastomer if necessary, and other components if necessary.

The kneading is performed by the use of a known kneader such as a biaxial kneader (TEM58SS, made by Toshiba Machine Co., Ltd.) and a simple kneader (Laboplastomill, made by Toyo Seiki Co., Ltd.). Here, the kneading temperature condition (cylinder temperature condition) is preferably lower than the decomposition temperature of the polylactic acid, more preferably in the range of from 150° to 220° C., and still more preferably in the range of from 160° C. to 200° C.

Resin Molded Article

A resin molded article according to this exemplary embodiment may be obtained by molding the resin composition according to this exemplary embodiment. For example, by molding the resin composition through the use of molding methods such as an injection molding method, an extrusion molding method, a blow molding method, and a thermal press molding method, the resin molded article according to this exemplary embodiment may be obtained. In this exemplary embodiment, the resin molded article is preferably obtained by molding the resin composition according to this exemplary embodiment by the use of an injection molding method, from the viewpoint of dispersibility of the components in the resin molded article.

The injection molding is performed by the use of a commercially-available machine such as "NEX150" made by Nissei Plastic Industrial Co., Ltd., "NEX70000" made by Nissei Plastic Industrial Co., Ltd., and "SE50D" made by Toshiba Machine Co., Ltd. At this time, the cylinder temperature is preferably in the range of from 160° C. to 240° C. and more preferably in the range of from 170° C. to 210° C., from the viewpoint of suppression of decomposition of the polylactic acid. The mold temperature is preferably in the range of from 30° C. to 120° C. and more preferably in the range of from 30° C. to 60° C., from the viewpoint of productivity.

Components of Electric and Electronic Equipment

Since the resin molded article according to this exemplary embodiment is superior in mechanical strength (impact resistance), moist heat resistance, and flame retardance, the resin molded article may be suitably used for applications of electric and electronic equipment, household electric appliances, vessels, and car interior products. More specifically, the resin molded article according to this exemplary embodiment can be suitably used for chasses and various components of household electric appliances or electric and electronic equipment, wrapping films, storage cases of a CD-ROM, a DVD, or the like, tablewares, food trays, beverage bottles, chemical wrapping materials, and the like. Among these, the resin molded article may be suitably used for the components of electric and electronic equipment. Since the components of electric and electronic equipment often have complicated shapes and are heavy products, high impact resistance and surface impact resistance are required. The resin composition according to this exemplary embodiment may sufficiently satisfy these requirements.

EXAMPLES

The invention will be more specifically described below with reference to examples and comparative examples, but the invention is not limited to the examples.

Examples 1 to 19

The compositions of Examples 1 to 19 shown in Table 1 are kneaded at a cylinder temperature of 180° C. by the use of a biaxial kneader (TEM58SS, made by Toshiba Machine Co., Ltd.), whereby resin compositions (compounds) are obtained. By molding the obtained resin compositions at the cylinder temperature of 180° C. and at the mold temperature of 100° C. by the use of an injection molding machine (NEX150, made by Nissei Plastic Industrial Co., Ltd.), the test samples shown in FIG. 1 are obtained.

Regarding abbreviated names of the components shown in Table 1, product names, compound names, and maker names are shown in Table 2.

Measurement and Evaluation

The obtained test samples are subjected to the following measurement and evaluation. The results are shown in Table 3.

Snap-Fit Test

Figure 2:
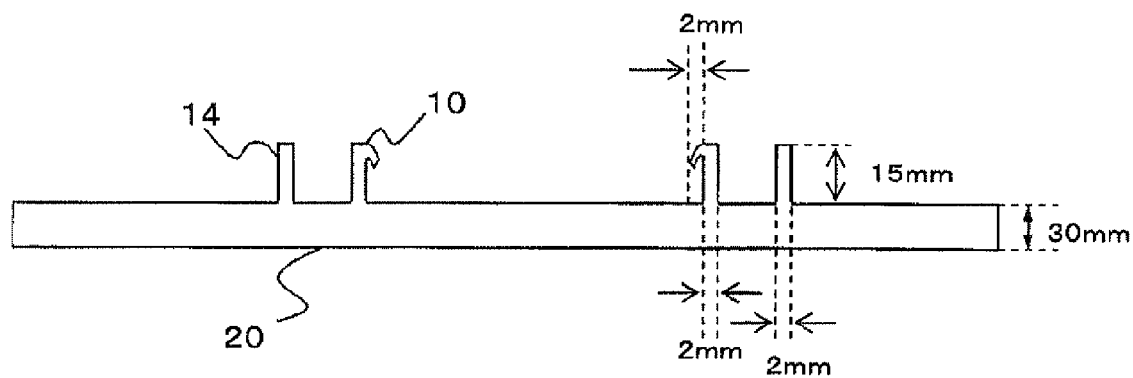
FIG. 2 is a sectional view of the test sample taken along line I-I of FIG. 1.
Figure 3:
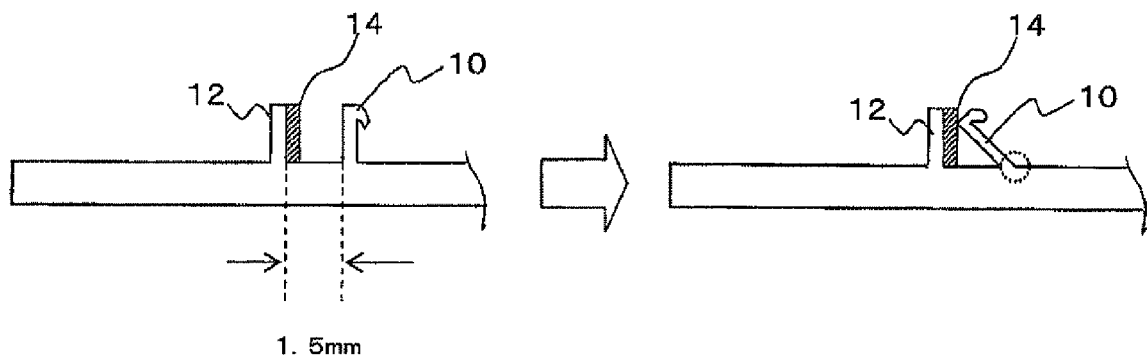
FIG. 3 is a diagram illustrating an example of the snap-fit test.

A cross-sectional view of the test sample 20 taken along line I-I of FIG. 1 is shown in FIG. 2. In FIG. 2, the gap between a snap-fit portion 10 and a rib portion 12 is set to 1.5 mm and the heights of the snap-fit portion 10 and the rib portion 12 are set to 15 mm. In this snap-fit test, as shown in FIG. 3, the degree of whitening of the extended base portion (portion surrounded with a broken line in FIG. 3) of the snap-fit portion 10 when the snap-fit portion 10 is made to tilt until the tip thereof comes in contact with the clearance gauge 14 while sequentially interposing plural clearance gauges 14 having different thicknesses between the snap-fit portion 10 and the rib portion 12, and the degree of whitening of the extended base portion of the snap-fit portion 10 when the snap-fit portion 10 is made to tilt until the tip thereof comes in contact with the rib portion 12 without interposing the clearance gauge 14 between the snap-fit portion 10 and the rib portion 12 are observed with a naked eye. The evaluation criterion is as follows and "A", "B" and "C" are allowable.

A: Whitening does not occur when the snap-fit portion is made to tilt without a clearance gauge interposed.

B: Whitening does not occur when the snap-fit portion is made to tilt with a clearance gauge having a thickness of 0.7 mm.

C: Whitening does not occur when the snap-fit portion is made to tilt with a clearance gauge having a thickness of 1.0 mm D: Whitening occurs when the snap-fit portion is made to tilt with a clearance gauge having a thickness of 1.3 mm Test Method of Flame Retardance A UL-V test is executed through the use of a method of UL-94 using a UL test sample for a V test (with a thickness of 1.6 mm) in UL-94. The result of the UL-V test shows that V-0 has the highest flame retardance, V-1 has the second highest flame retardance subsequently to V-0, and V-2 has the third highest flame retardance subsequently to V-1. It is shown that notV is the flame retardance inferior to V-2. Here, V-2 or higher levels are allowable.

Figure 4:
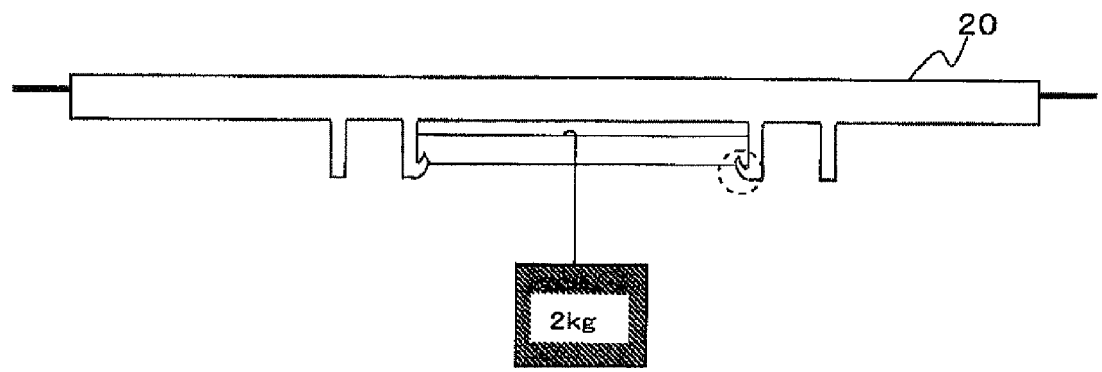
FIG. 4 is a diagram illustrating an example of a moist heat test method under high-temperature and high-humidity conditions.

Test Method of Moist Heat Resistance Under High-Temperature and High-humidity Conditions Four corners of a test sample are fixed under the 60° C. and 90% RH conditions, a plate is fixed to two snap-fit portions 10 of the test sample as shown in FIG. 4, and a weight of 2 kg is suspended from the plate. After this state is maintained for 50 hours, the degree of deformation (the degree of deformation of the portion surrounded with a broken line in FIG. 4) of the snap-fit portions and the cracks of the snap-fit portions are observed with a naked eye. The evaluation criterion is as follows and "A", "B" and "C" are allowable.

A: Deformation is not visible.

B: Slight bending is visible but there is no problem as a component.

C: Deformation is visible.

D: Deformation and Crack are generated.

Comparative Examples 1 to 6

Similarly to the examples, resin composition pellets with the compositions of Comparative Examples 1 to 6 shown in Table 1 are obtained and are molded through the use of the injection molding method, and the resultants are subjected to a characteristic test. The results are shown in Table 3.

TABLE 1

Numerical marks represent % added.

| | Polylactic acid | | Functional compound | | Flame retardant | | Rubber and/or thermoplastic elastomer | | Drip inhibitor | | Crystal nucleating agent | |
|---|---|---|---|---|---|---|---|---|---|---|---|---|
| | type | % by weight | type | % by weight | type | % by weight | type | % by weight | type | % by weight | type | % by weight |
| Ex. 1 | A1 | 65 | C1 | 2 | B1 | 29 | E1 | 3.8 | F1 | 0.2 | — | — |
| Ex. 2 | A2 | 61 | C2 | 1.5 | B2 | 27 | E1 | 5.3 | F1 | 0.2 | D1 | 5 |
| Ex. 3 | A1 | 70 | C1 | 1.5 | B1 | 25 | E1 | 3.3 | F1 | 0.2 | — | — |
| Ex. 4 | A1 | 66 | C1 | 0.5 | B1 | 26 | E2 | 7.3 | F1 | 0.2 | — | — |
| Ex. 5 | A1 | 64 | C1 | 0.3 | B2 | 32 | E1 | 3.5 | F1 | 0.2 | — | — |
| Ex. 6 | A2 | 53 | C3 | 2 | B1 | 25 | E1 | 10 | — | — | D1 | 10 |
| Ex. 7 | A1 | 70 | C1 | 0.7 | B1 | 25 | E3 | 4.3 | — | — | — | — |
| Ex. 8 | A1 | 75 | C2 | 1.8 | B1 | 23 | — | — | F1 | 0.2 | — | — |
| Ex. 9 | A2 | 75 | C1 | 1.8 | B1 | 20.2 | — | — | — | — | D1 | 3 |
| Ex. 10 | A1 | 65 | C1 | 2 | B3 | 25 | E1 | 7.8 | F1 | 0.2 | — | — |
| Ex. 11 | A1 | 70 | C1 | 1 | B1 | 17 | E1 | 2 | — | — | D1 | 10 |
| Ex. 12 | A1 | 60 | C1 | 0.1 | B1 | 30 | E1 | 9.7 | F1 | 0.2 | — | — |
| Ex. 13 | A1 | 57 | C1 | 5 | B1 | 35 | E1 | 2.8 | F1 | 0.2 | — | — |
| Ex. 14 | A1 | 55 | C1 | 7 | B1 | 35 | E1 | 2.8 | F1 | 0.2 | — | — |
| Ex. 15 | A1 | 88 | C1 | 2 | B1 | 10 | — | — | — | — | — | — |
| Ex. 16 | A1 | 55 | C1 | 2 | B1 | 40 | E1 | 2.8 | F1 | 0.2 | — | — |
| Ex. 17 | A1 | 72 | C1 | 1.6 | B1 | 25 | E1 | 1.2 | F1 | 0.2 | — | — |
| Ex. 18 | A1 | 54 | C1 | 1 | B1 | 30 | E1 | 15 | — | — | — | — |
| Ex. 19 | A1 | 64 | C1 | 2 | B1 | 29 | E1 | 3.8 | F1 | 0.2 | D2 | 1 |
| Com. Ex. 1 | A1 | 61 | C1 | 1.3 | B1/B5 | 22/6 | E1 | 9.5 | F1 | 0.2 | — | — |
| Com. Ex. 2 | A1 | 68 | C1 | 1.4 | B4 | 24 | E1 | 6.4 | F1 | 0.2 | — | — |
| Com. Ex. 3 | A1 | 68 | C4 | 1.4 | B1 | 27 | E1 | 3.4 | F1 | 0.2 | — | — |
| Com. Ex. 4 | A1 | 72 | — | — | B1 | 27.8 | — | — | F1 | 0.2 | — | — |
| Com. Ex. 5 | A2 | 85 | C3 | 2.7 | — | — | E1 | 9.1 | F1 | 0.2 | D1 | 3 |
| Com. Ex. 6 | A2 | 65 | C1 | 2 | B1 | 29 | E1 | 3.8 | F1 | 0.2 | — | — |

TABLE 2

| | Snap-fit test | Flame retardance | Endurance test under high-temperature and high-humidity conditions |
|---|---|---|---|
| Ex. 1 | A | V0 | A |
| Ex. 2 | A | V0 | A |
| Ex. 3 | B | V1 | A |
| Ex. 4 | A | V0 | B |
| Ex. 5 | C | V0 | B |
| Ex. 6 | A | V2 | A |
| Ex. 7 | B | V2 | B |
| Ex. 8 | C | V0 | C |
| Ex. 9 | C | V2 | C |
| Ex. 10 | B | V2 | B |
| Ex. 11 | C | V2 | B |
| Ex. 12 | C | V1 | B |
| Ex. 13 | A | V0 | B |
| Ex. 14 | A | V1 | B |
| Ex. 15 | B | HB | C |
| Ex. 16 | C | V0 | B |
| Ex. 17 | B | V0 | B |
| Ex. 18 | A | V2 | C |
| Ex. 19 | A | V0 | A |
| Com. Ex. 1 | B | V0 | D |
| Com. Ex. 2 | D | V1 | C |
| Com. Ex. 3 | D | V0 | B |
| Com. Ex. 4 | D | V0 | D |
| Com. Ex. 5 | B | notV | C |
| Com. Ex. 6 | B | V0 | D |

TABLE 3

| Component name | Sign | Product name or compound name | Maker name | Remark |
|---|---|---|---|---|
| Polylactic acid | A1 | Terramac TE7000 | Unitika | Including 1 part by weight of clay |
| | A2 | Terramac TE4000 | Unitika | Including no clay |
| Flame retardant | B1 | Exolit AP422 | Clariant | Ammonium polyphosphate |
| | B2 | FR CROS 484 | Budenheim | Ammonium polyphosphate |
| | B3 | Apinon 901 | Sanwa Chemical | Melamine sulfate |
| | B4 | MPP-A | Sanwa Chemical | Melamine polyphosphate |
| | B5 | FP-110 | FUSHIMI Pharmaceutical | Cyclophenoxy phosphazene |
| Functional compound | C1 | Stabaxol 1-LF | Rhein Chemie | N,N'-di-2,6-diisopropylphenyl carbodiimide |
| | C2 | N,N'-diisopropyl carbodiimide | Tokyo Chemical Industry Co., Ltd. | |
| | C3 | N,N'-dicyclohexyl carbodiimide | Tokyo Chemical Industry Co., Ltd. | |
| | C4 | Carbodilite LA1 | Nisshinbo Holdings | Polyfunctional compound, poly(4,4'-dicyclohexylmethane carbodiimide) |
| Rubber and/or thermoplastic elastomer | E1 | W600A | Mitsubishi Rayon | |
| | E2 | SRK200 | Mitsubishi Rayon | |
| | E3 | MR02 | Kaneka | |
| Crystal nucleating agent | D1 | talc | Nippon Talc | |
| | D2 | Ecopromote | Nissan Chemical Industries Ltd. | |
| Drip inhibitor | F1 | PTFE CD145 | Asahi Glass | |

It can be seen that the examples are superior in deformation resistance while maintaining heat resistance, compared with the comparative examples.

Applications for resin molded articles such as electric and electronic equipment, household electric appliances, vessels, and car interior products can be considered for the applicability of the invention.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A resin composition consisting of:
    a polylactic acid in the range from 30% by weight to 80% by weight with respect to the total content of the resin composition;
    a solid flame retardant selected from the group consisting of an ammonium polyphosphate and a melamine sulfate in the range from 10% by weight to 40% by weight with respect to the total content of the resin composition;
    a bifunctional compound that has a carbodiimide group in the range from 0.1% by weight to 5% by weight with respect to the total content of the resin composition;
    a crystal nucleating agent in the range from 0.1% by weight to 20% by weight with respect to the total content of the resin composition;
    a rubber and/or thermoplastic elastomer in the range from 1% by weight to 20% by weight with respect to the total content of the resin composition;
    a stabilizer selected from the group consisting of metal oxides, metal carbonates, zeolites, and hydrotalcites; and
    optionally any of an antioxidant, an ultraviolet absorber, a drip inhibitor, a release agent, a weathering agent, a light stabilizer, and a colorant.

2. The resin composition according to claim 1, wherein the solid flame retardant is the ammonium polyphosphate.

3. The resin composition according to claim 1, wherein the bifunctional compound is selected from the group consisting of N,N'-diisopropyl carbodiimide, N,N'-dicyclohexyl carbodiimide, and N,N'-di-2,6-diisopropylphenyl carbodiimide.

4. The resin composition according to claim 1, wherein the crystal nucleating agent is selected from the group consisting of talc, organic metal carboxylates and carboxylic amides.

5. A resin molded article formed by molding the resin composition according to claim 1.

6. A resin molded article formed by molding the resin composition according to claim 2.

7. A resin composition consisting of:
- a polylactic acid in the range from 30% by weight to 80% by weight with respect to the total content of the resin composition;
- a solid flame retardant selected from the group consisting of ammonium polyphosphates and solid flame retardants having sulfate or sulfite groups in the range from 10% by weight to 40% by weight with respect to the total content of the resin composition;
- a bifunctional compound that has a carbodiimide group in the range from 0.1% by weight to 5% by weight with respect to the total content of the resin composition;
- a crystal nucleating agent in the range from 0.1% by weight to 20% by weight with respect to the total content of the resin composition;
- a rubber and/or thermoplastic elastomer in the range from 1% by weight to 20% by weight with respect to the total content of the resin composition;
- a stabilizer selected from the group consisting of metal oxides, metal carbonates, zeolites, and hydrotalcites; and
- optionally any of an antioxidant, an ultraviolet absorber, a drip inhibitor, a release agent, a weathering agent, a light stabilizer, and a colorant.

8. The resin composition according to claim 1, wherein the crystal nucleating agent is selected from the group consisting of organic metal carboxylates and carboxylic amides.

9. The resin composition according to claim 7, wherein the crystal nucleating agent is selected from the group consisting of organic metal carboxylates and carboxylic amides.

10. The resin composition according to claim 1, wherein the drip inhibitor consists of polytetrafluoroethylene.

11. The resin composition according to claim 7, wherein the drip inhibitor consists of polytetrafluoroethylene.

* * * * *